Oct. 18, 1932.   H. F. TURNER   1,883,133
SEED DRILL
Filed May 2, 1930   2 Sheets-Sheet 1
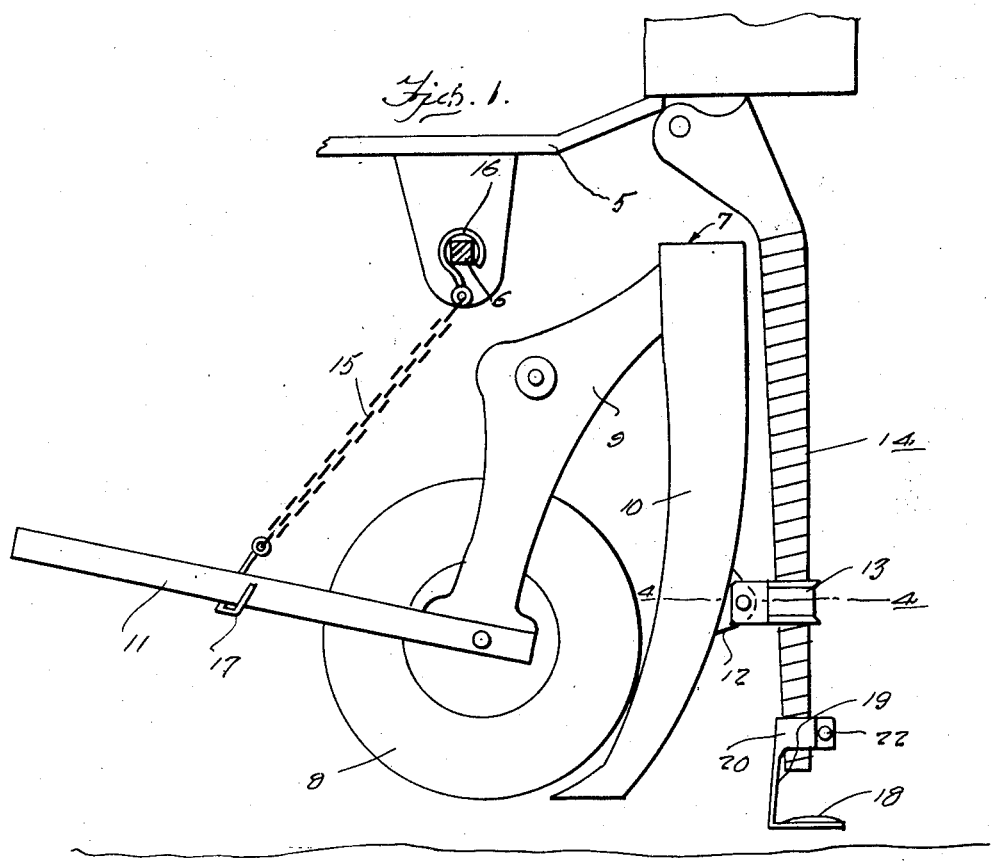
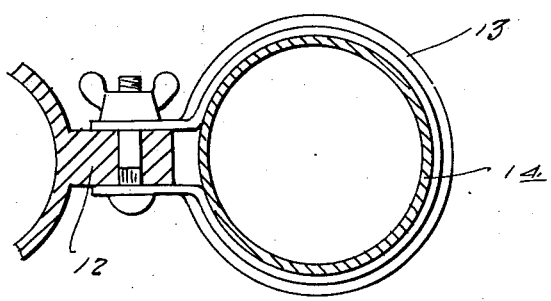
Inventor
H. F. Turner
By Clarence A. O'Brien
Attorney

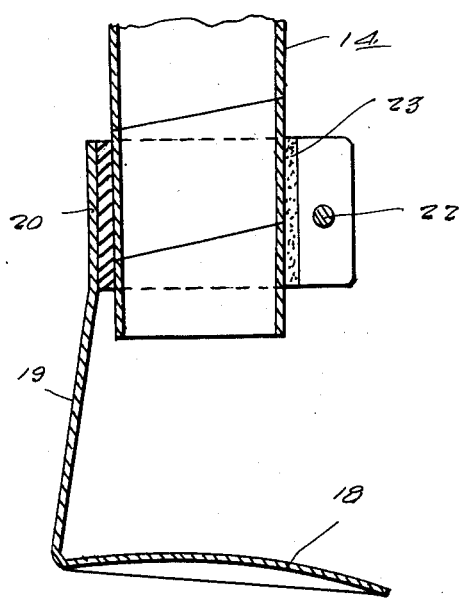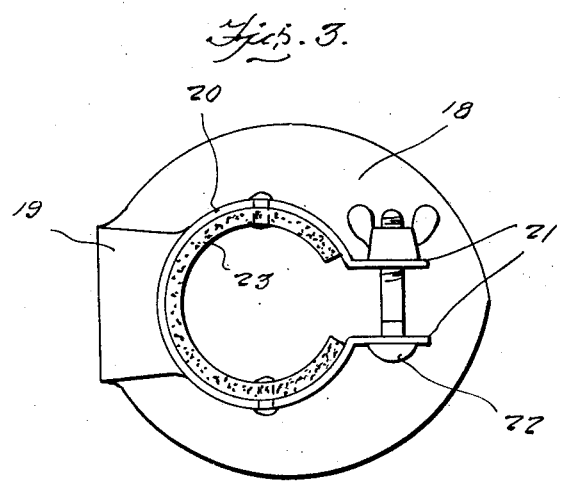

Patented Oct. 18, 1932

1,883,133

UNITED STATES PATENT OFFICE

HERMAN F. TURNER, OF YUKON, OKLAHOMA

SEED DRILL

Application filed May 2, 1930. Serial No. 449,253.

This invention relates to appreciable mechanical refinements and improvements of a supplementary nature incorporated in a seed drilling machine.

More explicitly defined, the invention embodies two principal features; namely, a lifting and retaining chain for holding the drill and disk assembly in an elevated temporary position, together with an attachment for the discharge end of the seed delivery conduit wherein said attachment functions for uniformly spreading and distributing the seed on the surface.

The primary improvement is in the spreader attachment, which is in the nature of a simplified appliance, comprising an attaching clamp, a suspension arm, and a concavo-convex spreading disk or plate located directly beneath the discharge end of the seed delivery tube.

In the drawings:

Figure 1 represents an elevational view showing each tube, the drill assembly, the hoisting chain, and the attachment for the tubes.

Fig. 2 is an enlarged detail sectional view showing the attachment and its spreader plate.

Fig. 3 is a top plan view of the attachment per se.

Fig. 4 is a cross sectional view taken approximately on the plane of the line 4—4 of Fig. 1.

Referring to the drawings in Fig. 1, the frame of the machine is generally represented by the numeral 5 and this supports the shaft 6 which carries the usual arms for compressing the springs which force the disks 8 into the ground. These disks and the boots 10 with the mountings 9 are supported in the usual manner from the drag bars 11 which are pivoted at their forward ends to a front part of the frame 5. These parts are of the usual construction and as the invention consists of means for supporting the disks and the shoes or boots in elevated position, and for holding the feed tubes 14 in rear of the boots, it is not thought necessary to describe the construction of the drill in detail.

As shown in Fig. 4, each boot is provided intermediate its ends with an outstanding lug 12, carrying a clamp 13 which embraces the lower end portion of the seed delivery tube or conduit 14. In connection with these details, I invite attention to the numeral 15 which represents a lifting and retaining chain having a hook 16 at the top to engage over the shaft 6, and a hook 17 at the bottom to engage beneath and around the drag bar 11.

This chain serves to lift the details 8 and 10 off of the ground. The improved attachment shown in Figs. 1, 2 and 3 comprises a concavo-convex disk-like spreader plate 18 having an upstanding attaching arm 19 wherein said arm is formed at its top with a split clamp 20. The split ends are directed laterally outward in spaced parallelism as at 21 to accommodate a clamping bolt 22.

On the inner periphery of this clamp is a pad 23. The padded clamp is fastened on the lower discharge end of the tube 14 so as to locate the convex side or face of the spreader plate 18 directly beneath the discharge end thereof. As will be understood, each tube 14 is removed from its boot 10 and fastened to the rear of the boot by the clamp 13 engaging the lug 12. Then the clamp 20 is fastened to the lower end of the tube so as to place the spreader 18 under the discharging edge of the tube so that this spreader will spread the grain dropping from the tube. The chain 15 holds the disk 8 and the boot 10 above the ground, so that these elements will not disturb the even surface of the ground.

Particularly do I emphasize the arrangement of a seed spreader attachment on the discharge end of the feed delivery tube, together with means for lifting and holding the disk and boot out of the way, so as to leave the ground substantially smooth and undisturbed for uniform spreading of the seed.

The present embodiment of the invention has been disclosed in considerable detail merely for the purpose of exemplification since in actual practice it attains the features of advantage enumerated as desirable in the statement of the invention and the above description.

It is to be understood that by describing in detail herein any particular form, structure, or arrangement, it is not intended to limit the invention beyond the terms of the several claims or the requirements of the prior art.

Having thus described my invention, what I claim as new is:—

5. Means for converting a row drill provided with disks, boots, and drill tubes into a broadcasting drill comprising means for holding the disks and boots in elevated position, means for holding each drill tube in rear of the boot and a spreader attached to the lower end of each tube.

In testimony whereof I affix my signature.

HERMAN F. TURNER.